US008090755B1

(12) United States Patent
Old (10) Patent No.: US 8,090,755 B1
(45) Date of Patent: Jan. 3, 2012

(54) PHASE ACCUMULATION (75) Inventor: Gordon Old, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 1218 days.

(21) Appl. No.: 11/807,112

(22) Filed: May 25, 2007

(51) Int. Cl.
*G06F 1/02* (2006.01)
*G06F 7/50* (2006.01)
*H03B 21/00* (2006.01)

(52) U.S. Cl. ............ 708/271; 708/708; 327/105

(58) Field of Classification Search .......... 327/105–107; 708/271, 276, 629, 708
See application file for complete search history.

(56) References Cited

U.S. PATENT DOCUMENTS

| 4,652,832 | A | * | 3/1987 | Jasper | 327/106 |
| 5,519,343 | A | * | 5/1996 | Britz | 327/106 |
| 5,570,392 | A | * | 10/1996 | Young et al. | 375/308 |
| 6,333,649 | B1 | * | 12/2001 | Dick et al. | 327/105 |
| 6,650,150 | B2 | * | 11/2003 | Farine et al. | 327/106 |
| 7,424,503 | B2 | * | 9/2008 | Moore et al. | 708/490 |

OTHER PUBLICATIONS

Xilinx Inc., "Using Block RAM in Spartan-3 FPGAs", XAPP463, v1.1.2, Jul. 2003.*
Xilinx Inc., "DDS v5.0", DS246 Product Specification, v2.1, Apr. 2005.*
Betowski et al., "Considerations for Phase Accumulator Design for Direct Digital Frequency Synthesizers", Proceedings of the 2003 International Conference on Neural Networks and Signal Processing, vol. 1, pp. 176-179, Dec. 2003.*
Noll, "Carry-Save Arithmetic for High-Speed Digital Signal Processing", IEEE International Symposium on Circuits and Systems, pp. 982-986, vol. 2, May 1990.*
U.S. Appl. No. 11/807,113, filed May 25, 2007, Old, Gordon, Xilinx, Inc., 2100 Logic Drive, San Jose, CA.

* cited by examiner

*Primary Examiner* — Lewis Bullock, Jr.
*Assistant Examiner* — Matthew Sandifer
(74) *Attorney, Agent, or Firm* — W. Eric Webostad; John J. King (57) ABSTRACT

A method for accumulation of information is described. The information is separated into first portions of MSBs and second portions of LSBs. The first and second portions are respectively input to a first adder and a second adder to provide first and second sums. The first and second sums are output from a first and a second storage device for feedback input respectively to the first and second adder to provide the first and second sums. A carry bit output from the second storage device is generated responsive to each wrap condition associated with the storing of the second sums in the second storage device. The carry bit is fed back to the first adder and fed forward for subsequent consolidation with the first sums respectively output from the first storage device. The first sums and the second sums are respectively accumulated as numbers represented in a redundant number system.

19 Claims, 8 Drawing Sheets

PHASE ACCUMULATION

FIELD OF THE INVENTION

One or more aspects of the invention relate generally to integrated circuits and, more particularly, to an integrated circuit for phase accumulation.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA is the Xilinx Virtex™ FPGA available from Xilinx, Inc., 2100 Logic Drive, San Jose, Calif. 95124. Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

In a Direct Digital Synthesizer ("DDS") or a Numerically Controlled Oscillator ("NCO"), conventionally a sequence of numbers describing a value of a sinusoid wave are generated using a look-up table of values. The sequence of numbers is a sequence of phase values or phase increments. A phase accumulator is used to accumulate phase increments to generate a phase slope signal. The phase slope signal may be adjusted by a phase offset or dither noise, or a combination of both phase offset and dither noise.

Conventionally, substantially fine frequency resolution is implemented for a DDS or an NCO. The degree of frequency resolution is conventionally associated with the depth of the look-up table, as well as the data width of the phase slope signal generated. Even though the phase slope signal may be quantized, where only Most Significant Bits ("MSBs") of the phase slope signal are used to provide an address to a look-up table, this quantization occurs after phase accumulation. Thus, a significantly large number of bits may be used for a phase accumulation stage which is positioned prior to a quantization stage.

For implementing a phase accumulator, a carry chain in a phase accumulator adders stage may be significantly lengthy owing to the number of bits used to obtain a desired frequency resolution. The length of such a carry chain may thus be a speed limiting path, and may even be a "critical path", of a DDS or an NCO.

Accordingly, it would be desirable and useful to provide means for reducing the impact of delay associated with phase accumulation.

SUMMARY OF THE INVENTION

One or more aspects of the invention generally relate to integrated circuits and, more particularly, to an integrated circuit for phase accumulation.

An aspect of the invention relates generally to a method for accumulation of information. The information is obtained in increments in succession. Each increment of the increments is separated into at least a first portion and a second portion. The first portion is associated with Most Significant Bits of the increment. The second portion is associated with Least Significant Bits of the increment. The first portion is input to a first adder to provide a first sum. The second portion is input to a second adder to provide a second sum. The first sum is stored in a first storage device. The second sum is stored in a second storage device. The first sum stored in the first storage device is output for feedback input to the first adder for addition with a next first portion of a next increment of the increments. The second sum stored in the second storage device is output for feedback input to the second adder for addition with a next second portion of the next increment of the increments. A carry bit is generated responsive to each wrap condition associated with the storing of the second sum in the second storage device. The carry bit is output from the second storage device. The carry bit is fed back to the first adder. The carry bit is fed forward for addition with the first sum output from the first storage device. The first sum and the second sum are respectively accumulated as numbers represented in a redundant number system.

Another aspect of the invention relates generally to a circuit for direct digital synthesis or numerically controlled oscillation which has a phase accumulator. A carry chain is coupled to the phase accumulator. The phase accumulator and the carry chain are configured as a pipeline having parallel data paths. A first data path of the parallel data paths is for Most Significant Bits. A second data path of the parallel data paths is for Least Significant Bits. The phase accumulator is configured for accumulating phase increments separated out into a first storage device and a second storage device respectively associated with the first data path and the second data path. The second storage device is configured for wrap around operation. The second storage device is coupled to a first adder associated with the first storage device. The second storage device is configured to produce a carry bit responsive to a wrap around condition for feedback input to the first adder and feed-forward input to a second adder. Both the first adder and the second adder form part of the first data path. An output port of the first storage device is coupled for feed-forward input to the second adder and for feed-back input to the first adder. An output port of the first adder is coupled for feed-forward input to the first storage device. An output port of the second storage is device coupled for feed-forward input along the second data path and for feed-back input to a third adder. An output port of the third adder is coupled for feed-forward input along the second data path for the second storage device. The first adder is coupled to receive a first portion of the phase increments associated with the Most Significant Bits. The third adder is coupled to receive a second portion of the phase increments associated with the Least Significant Bits.

Yet another aspect of the invention relates generally to a method for direct digital synthesis or numerically controlled oscillation. A phase increment is separated into respective sequential groupings of bits for parallel pipelined data paths. Each of the parallel pipelined data paths is not an uppermost one thereof. An associated portion of the sequential groupings of bits is respectively accumulated. A carry bit is generated responsive to a wrap around condition caused by the accumulation. The carry bit is fed backward and forward for respective additions in a proximate upper parallel pipelined data path.

BRIEF DESCRIPTION OF THE DRAWINGS

Accompanying drawing(s) show exemplary embodiment (s) in accordance with one or more aspects of the invention; however, the accompanying drawing(s) should not be taken to limit the invention to the embodiment(s) shown, but are for explanation and understanding only.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

In the following description, an accumulator, which may be implemented in a DDS or an NCO, is described. Such an accumulator may be instantiated in programmable logic of a PLD, such as an FPGA, or may be implemented as hardwired logic. The accumulator described below may be used for accumulating input other than phase increments; however, the example of phase increments is described for purposes of clarity by way of example and not limitation. A carry chain including an accumulator and adders in phase accumulation stages is separated out into two or more groups of bits for traveling along separate data paths. Thus, for example, if input data width were 32 bits wide, 16 Most Significant Bits ("MSBs") may be fed to one pipelined data path and 16 Least Significant Bits ("LSBs") may be fed to another pipelined data path. Furthermore, it should be appreciated that the number of pipelined data paths is not limited to two. Thus, continuing the above example, input data width may be divided into bit groupings of another evenly divisible number of 32, such as 8-bit wide bit groupings and four associated pipelined data paths. In this example, eight MSBs would be provided to an uppermost pipelined data path and eight LSBs would be provided to a lowermost pipelined data path. Furthermore, eight interim MSBs would be provided to a pipelined data path immediately below the uppermost pipelined data path, and eight interim LSBs would be provided to a pipelined data path immediately above the lowermost pipelined data path. By effectively dividing inputs into sequences of groupings of bits, the carry chain, including an accumulator and adders in phase accumulation stages, is separated out to facilitate higher speeds. Notably, even though equally sized groups or slices of a full accumulation may lead to a maximal speed, non-equally sized slices may be used as they too will improve upon speed of operation in comparison to a conventional long carry chain design. Furthermore, as shall be appreciated from the following description, pipelined stages associated with addition may be compressed or "accordioned" to provide a reduction in overall latency of the carry chain, as well as an associated reduction in circuit resources. Additionally, it should be appreciated that rather than using conventional signed and unsigned binary representation of numbers, a redundant number system may be used. In other words, slices, plus their carry bits as applicable, may be considered a carry save or redundant number system.

Figure 1:
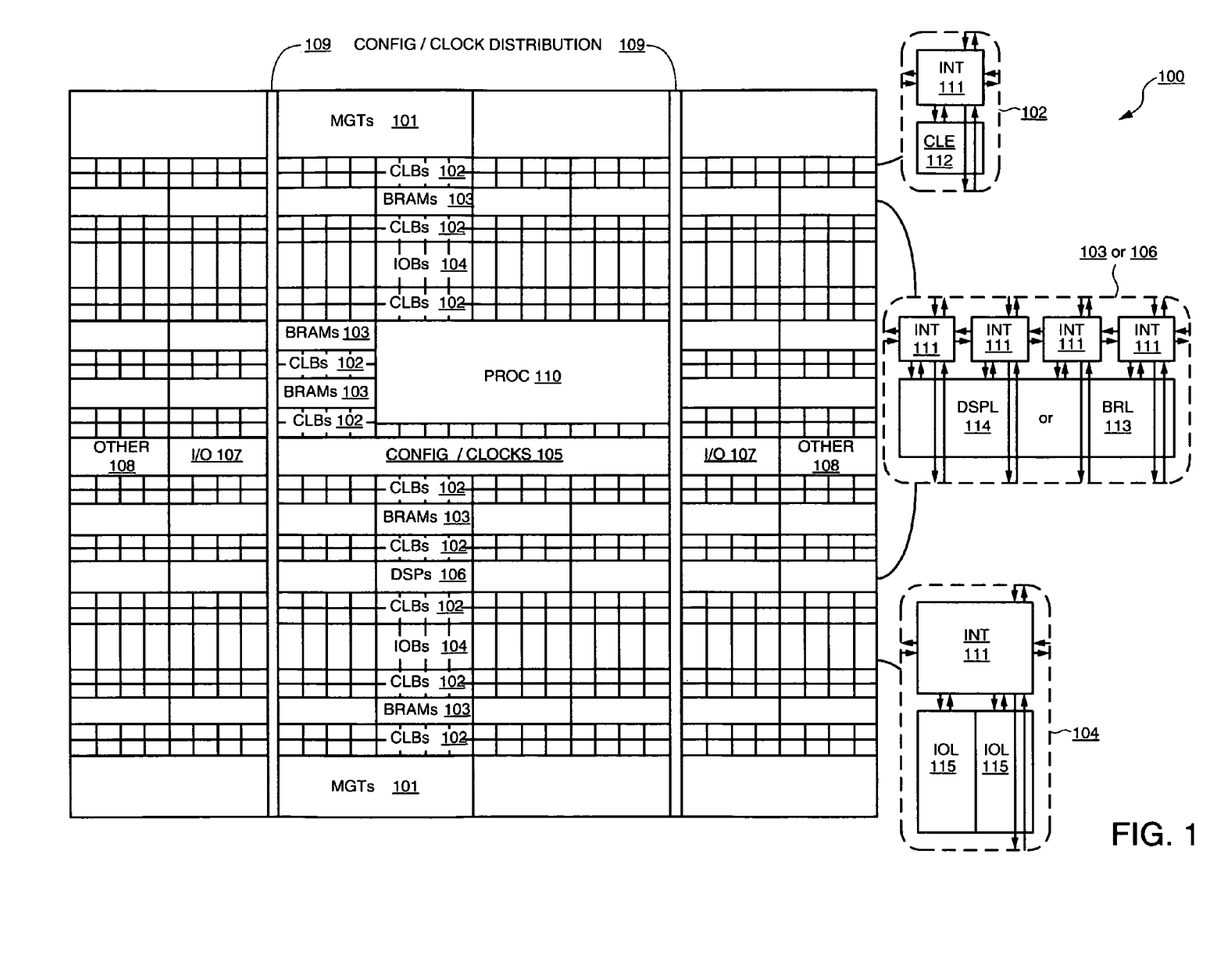
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110.

In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A' DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4 FPGA from Xilinx of San Jose, Calif.

Figure 2A:
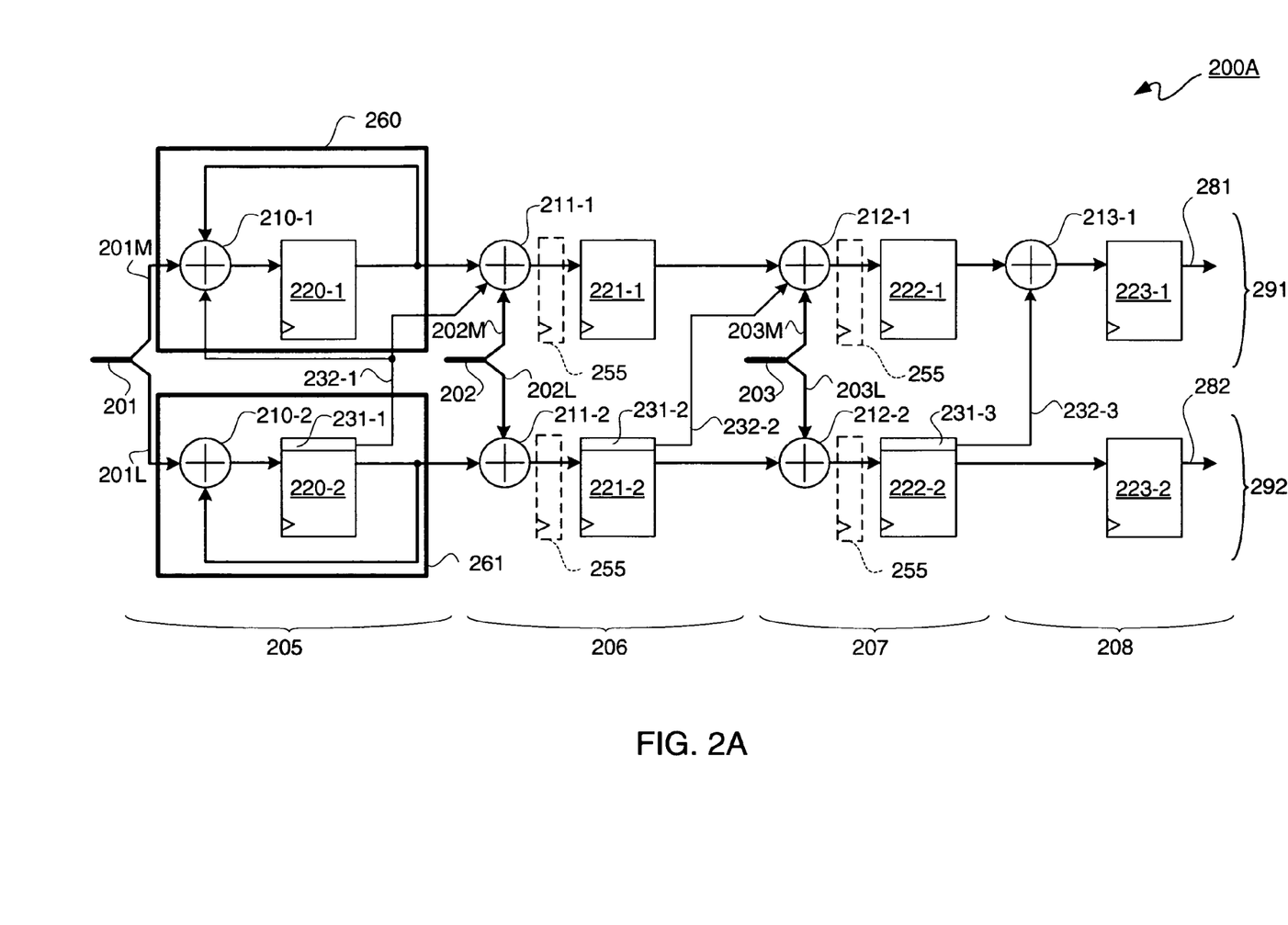
FIGS. 2A through 2D are block/circuit diagrams depicting respective exemplary embodiments of a phase accumulator.

FIG. 2A is a block/circuit diagram depicting an exemplary embodiment of a phase accumulator 200A. Phase accumulator 200A includes stages 205 through 208. A phase increment 201 has a data bit width which is divided out by busing into MSBs 201M and LSBs 201L. MSBs 201M are input to adder 210-1 and LSBs 201L are input to adder 210-2.

Output of adder 210-1 is provided as an input to registers 220-1. Notably, even though a single block is illustratively shown for registers, it should be appreciated that for processing multiple bits in parallel, multiple registers, such as multiple flip-flops, in parallel may be used. Notably, all registers of phase accumulator 200A may be clocked responsive to a same clock signal for synchronous operation, which clock signal is omitted herein for purposes of clarity. Furthermore, although registers are described for purposes of clarity by way of example, it should be appreciated that other storage means may be used. More particularly, for an FPGA implementation for example, BRAM may be used in place of registers. BRAM may be time-multiplexed for input and output of phase information.

Output of registers 220-1 is provided as an input to adder 211-1 and as a feedback input to adder 210-1. Accordingly, it should be appreciated that the relationship between adder 210-1 and registers 220-1 forms an accumulator circuit 260 for processing MSBs 201M. In parallel with accumulator circuit 260 is an accumulator circuit 261 for processing LSBs 201L. LSBs 201L are input to adder 210-2. Output of adder 210-2 is provided as an input to registers 220-2. Output of registers 220-2 is provided as an input to adder 211-2 and as a feedback input to adder 210-2.

Additionally, registers 220-1 and 220-2 may be configured as circular buffers. Thus, it should be appreciated that accumulators 260 and 261 are wrapping accumulators. Once registers 220-1 or 220-2 reach the end of their storage capacity, namely the end of the stack, or exceed the depth of the buffer, they wrap back to an initial storage location. Thus, the phase slope signals respectively output from registers 220-1 and 220-2 may be "ramp" or "saw-tooth" signals. With respect to an uppermost pipelined data path 291 as associated with in this example, for registers 220-1 a wrap or carry bit associated with a wrap condition is not used. However, with respect to registers 220-2 of lowermost pipelined data path 292, responsive to the end of the buffer being reached, as generally indicated by box 231-1 of registers 220-2, a carry bit 232-1 is output as a logic 1.

Carry bit 232-1 is provided as a feed-forward input to adder 211-1 of a proximate upper pipelined data path, which in this example is an uppermost pipelined data path 291 of phase accumulator 200A, as well as being provided as a feedback input to adder 210-1 of the same pipelined data path. This feeding back of a carry bit 232-1 may be thought of as a "carry-save" accumulation.

Figure 2B:
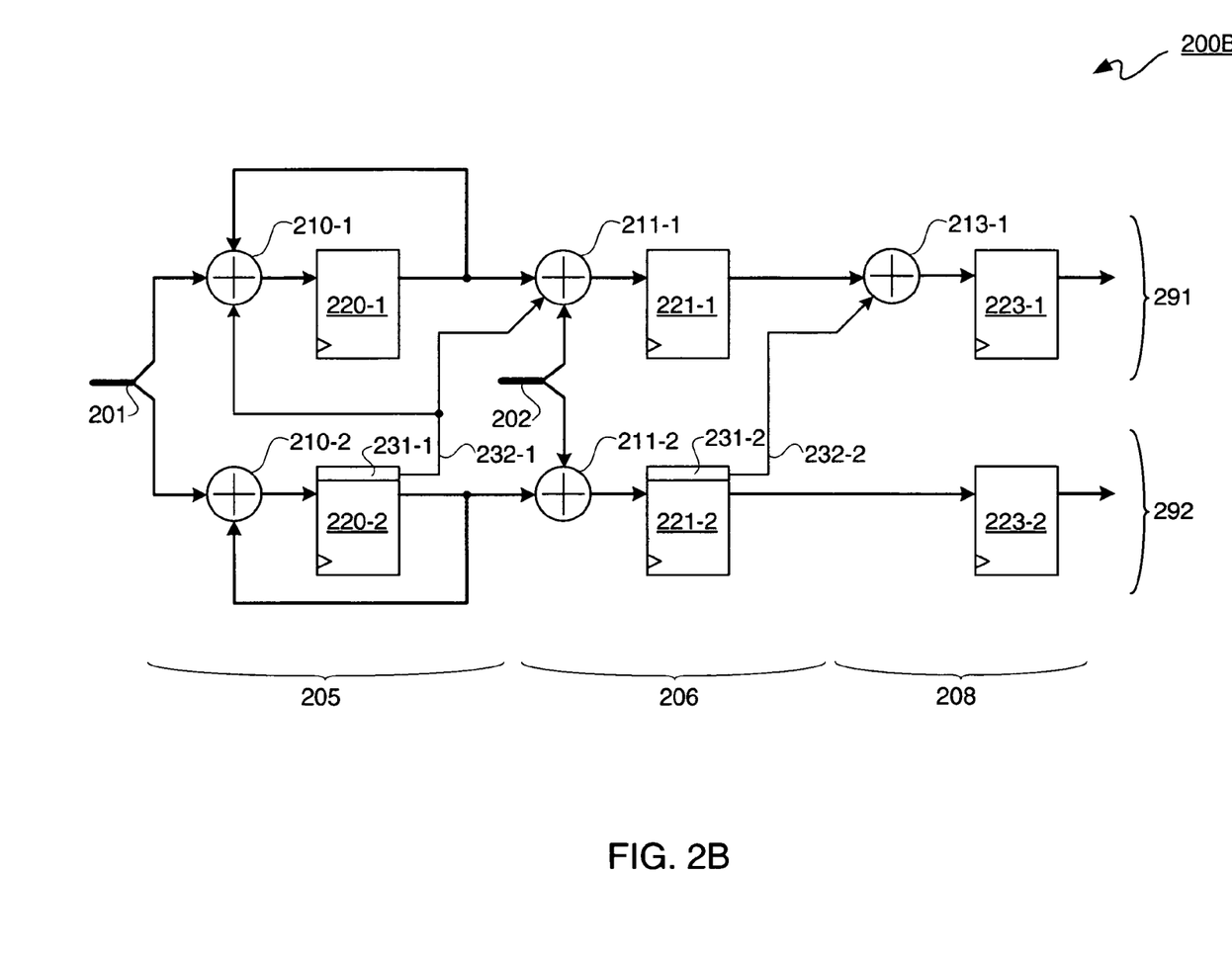
Figure 2C:
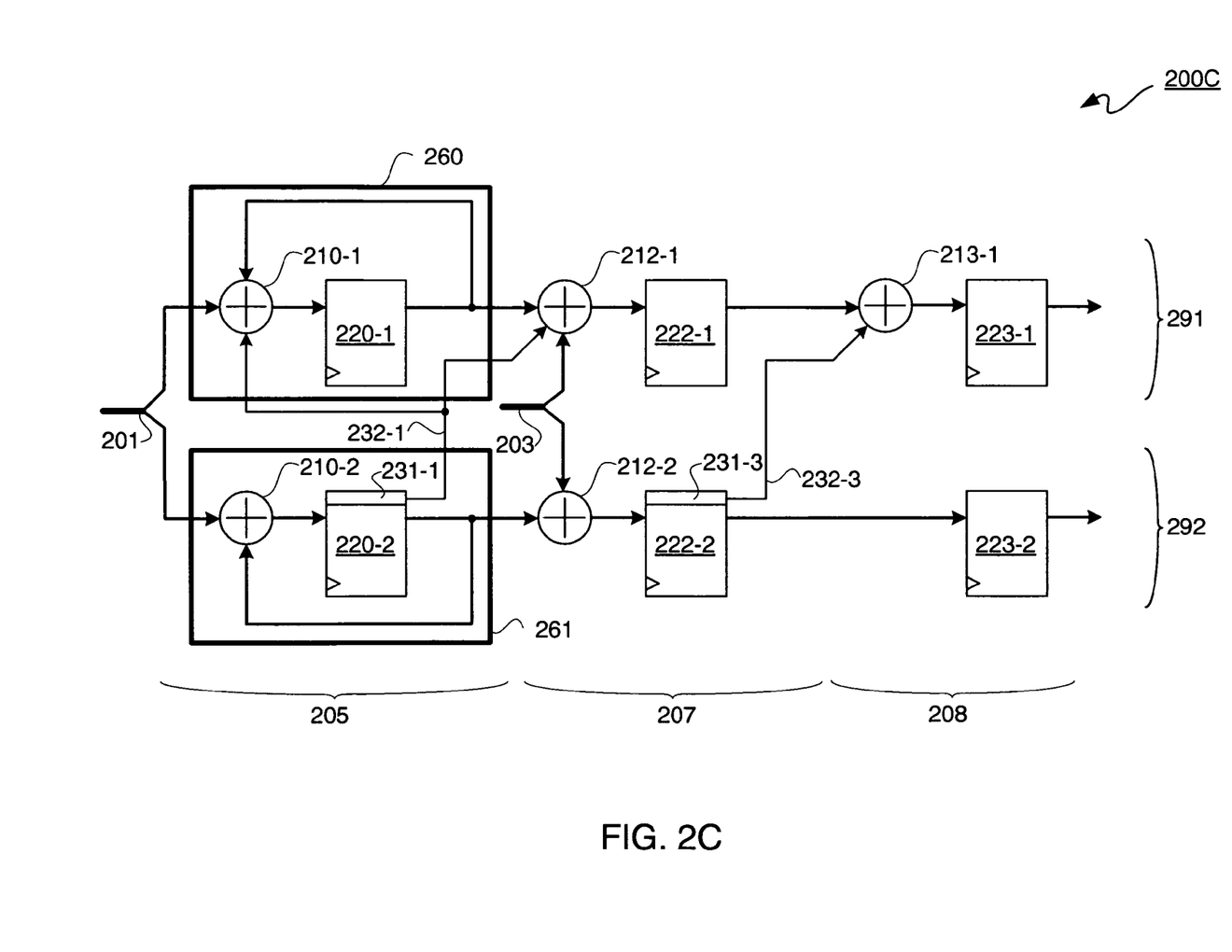
Figure 2D:
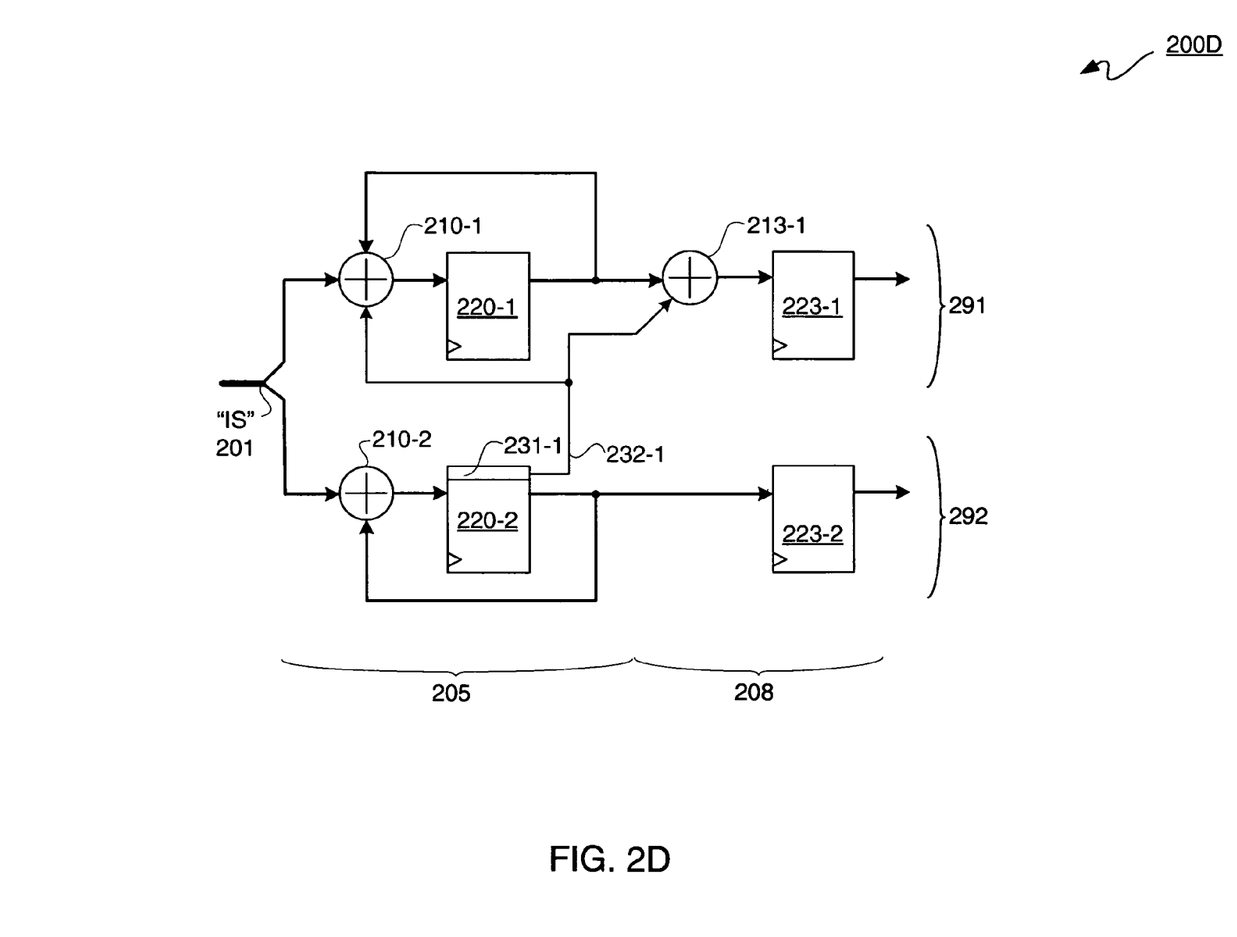

Accumulator circuits 260 and 261 as described above form phase accumulation stage 205. Outputs from phase accumulation stage 205 as described above may be provided directly to a carry chain consolidation stage 208 as indicated in the block/circuit diagram of FIG. 2D depicting an exemplary embodiment of a phase accumulator 200D. Alternatively, one or more of optional stages 206 and 207 may be implemented. For example, a phase offset stage 206 may be implemented as illustratively shown in the block/circuit diagram of FIG. 2B, where there is shown a block/circuit diagram depicting an exemplary embodiment of a phase accumulator 200B. Furthermore, a dither noise stage 207 may be implemented as illustratively shown in the block/circuit diagram of FIG. 2C, depicting an exemplary embodiment of a phase accumulator 200C. However, for purposes of clarity by way of example and not limitation, it shall be assumed that both optional stages 206 and 207 are implemented as illustratively shown in FIG. 2A. As the various components of phase accumulators 200B through 200D are described below with respect to the description of phase accumulator 200A, such description is not repeated for purposes of clarity.

Phase offset 202 in this example is divided out into MSBs 202M and LSBs 202L. MSBs 202M of phase offset 202 are input to adder 211-1, and LSBs 202L of phase offset of 202 are input to adder 211-2. Outputs of adders 211-1 and 211-2 are respectively input to registers 221-1 and 221-2. Notably, because a redundant number system is used for accumulated values, registers 255, which may respectively be used in stages 206 and 207 between respective input adders and registers of those stages, need not be used. In other words, registers 255 may be omitted reducing the overall latency of pipelined data paths 291 and 292, as well as reducing the circuit resource count of phase accumulator 200A. By removing registers 255 and thus compressing or "accordioning" optional stages 205 through 207, only a last register stage of the carry chain, namely consolidation stage 208, may be used for purposes of consolidating a last carry bit.

Output from registers 221-1 is provided as an input to adder 212-1 of stage 207, and output from registers 221-2 is provided as an input to adder 212-2. A carry bit 232-2 responsive to a wrap condition of registers 221-2 as generally indicated by box 231-2 is provided as an input to adder 212-1.

A dither noise input 203 is divided into MSBs 203M and LSBs 203L. MSBs 203M of dither noise input 203 are provided as an input to adder 212-1 and LSBs 203L of dither noise input 203 are provided as an input to adder 212-2. Output of adder 212-1 is provided as an input to registers 222-1 and output of adder 212-2 as provided as an input to registers 222-2.

Output of registers 221-1 is provided as an input to adder 213-1 of stage 208, and output of registers 221-2 is provided as an input to registers 223-2. It should be appreciated that adder 213-1 is a final consolidation and thus output of adder 213-1 is not a redundant number system output, but rather is an output of MSBs for a phase slope in a conventional number system. Registers 222-2 provide a carry bit input 232-3 to adder 213-1 responsive to a wrap condition, as generally indicated by box 231-3. Output of registers 222-2 provided to registers 223-2 is an output of LSBs of a phase slope signal consolidated from a prior stage add, namely in this example addition by adder 212-2. Thus, output from adder 212-2 is not a redundant number system output, but rather is an output of LSBs for a phase slope in a conventional number system. Accordingly, outputs of registers 223-1 and 223-2 are consolidated MSBs and LSBs, respectively, of a phase slope signal.

It should be appreciated that phase accumulator 200A is a pipelined accumulator having separate pipelined data paths 291 and 292 with corresponding stages. Each of stages 205 through 208 are synchronously operated for piping data through phase accumulator 200k Data output from phase accumulator 200A is a phase slope signal having been divided out into separate sets of sequences of bits, such as for example a set of MSBs 281 and a set of LSBs 282.

Phase accumulator 200A may accept variable inputs, and such variable inputs may change on each clock cycle of a clock (not shown) used to operate phase accumulator 200.

It should be appreciated that by separating phase accumulator 200A into n multiple pipelined data paths, for n a positive integer greater than 1, as the value of n increases, the length of the carry chain in each of the pipelined data paths correspondingly becomes shorter. This facilitates operation of phase accumulator 200 at higher frequencies of operation than longer conventional carry chains. Although the example of FIGS. 2A through 2D is for n equal to two, it should be appreciated that n may be a number larger than two. An example for n equal to three is illustratively shown in block/circuit diagram of FIG. 3 depicting an exemplary embodiment of a phase accumulator 300 with three pipelined data paths 291 through 293.

Figure 3:
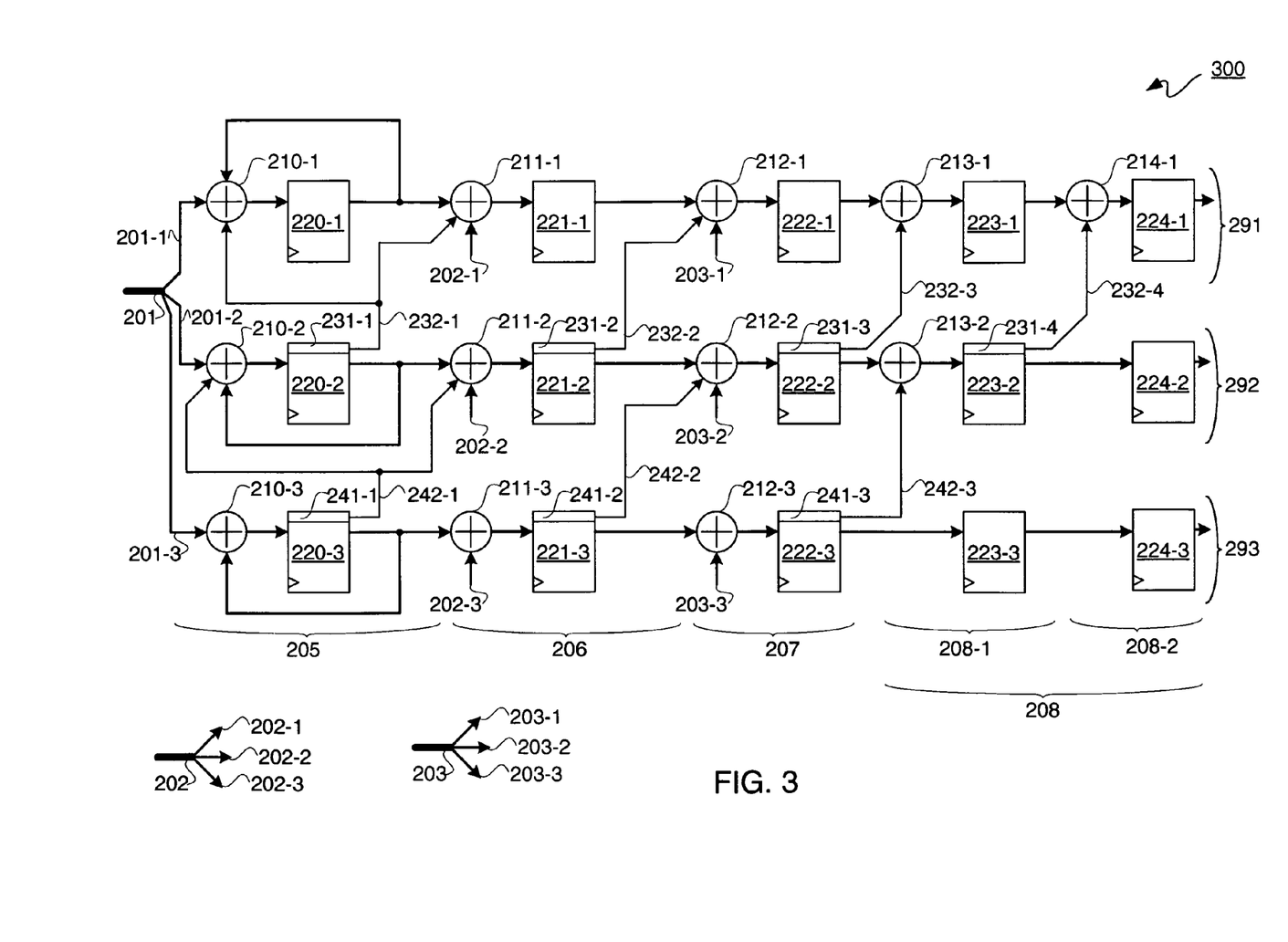
FIG. 3 is a block/circuit diagram depicting an exemplary embodiment of a phase accumulator with three pipelined data paths.

In FIG. 3, phase increment 201 is divided into three sets of sequences of bits 201-1 through 201-3. Notably, phase accumulator 300 of FIG. 3 is similar to phase accumulator 200A of FIG. 2A, and thus generally only the differences are described for purposes of clarity. Furthermore, assuming optional stages 206 and 207 are implemented, phase offset 202 may divided into three sequences of bits 202-1 through 202-3, and dither noise input 203 may be divided into three sequences of bits 203-1 through 203-3. Each of the separate sequences of bits of inputs 201 through 203 are respectively provided to respective input adders for each of the associated pipelined data paths, namely to adders 210-1 through 210-3, adders 211-1 through 211-3, and adders 212-1 through 212-3. Thus, for example, with respect to pipelined data path 293, LSBs 201-3 of phase increment 201 are provided to adder 210-3. Output of adder 210-3 is provided as an input to registers 220-3. Output of registers 220-3 is provided as a feed-forward input to adder 211-3 and as a feedback input to adder 210-3. Responsive to a wrap condition, register 220-3 provide a carry bit 242-1 as a feedback input to adder 210-2 and as a feed-forward input to adder 211-2. Wrap condition for registers 220-3 is generally indicated by box 241-1.

Continuing the description of pipelined data path 293, LSBs 202-3 of phase offset 202 are input to adder 211-3, and output of adder 211-3 is provided as an input to registers 221-3. Output of registers 221-3 is provided as an input to adder 212-3. Responsive to a wrap condition by registers 221-3 as generally indicated by box 241-2, a carry bit 242-2 is provided as a feed-forward input to adder 212-2.

LSBs 203-3 of dither noise input 203 are provided as an input to adder 212-3. Output of adder 212-3 is provided to registers 222-3. Output of registers 222-3 is provided as an input to registers 223-3. Responsive to a wrap condition as generally indicated by box 241-3 of registers 222-3, a carry bit 242-3 from registers 222-3 is provided as an input to adder 213-2. Notably, adder 213-2 was not present in phase accumulator 200A of FIG. 2A, but is added here to accommodate the addition of pipelined data path 293. Likewise, additional register and adder stages may be added. Thus, for the addition of pipelined data path 293 to pipelined data paths 291 and 292, an additional register stage is added to the carry chain, or more particularly to consolidation stage 208, as generally indicated by substages 208-1 and 208-2. With respect to substages 208-1 and 208-2, registers 223-3 and 224-3, respectively of those substages, are coupled in series to maintain synchronous operation for pipelining with associated registers in pipelined data paths 291 and 292.

With respect to pipelined data path 292, register 223-2 is added to receive output from an adder 213-2. Furthermore, registers 223-2 are configured to provide a carry bit 232-4 to adder 214-1 of pipelined data path 291 responsive to a wrap condition as generally indicated by box 231-4 of registers 223-2. Thus, it should be appreciated that a final consolidation of bits occurs with the output of adder 214-1 in an uppermost pipelined data path 291. Output of registers 223-2 are provided to registers 224-2 which are coupled in series in pipelined data path 292, again for purposes of synchronous pipelined operation.

Output of registers 223-1 is provided as an input to adder 214-1. Output of adder 214-1, which is a consolidated number, is provided as an input to registers 224-1. Accordingly, it should be appreciated the outputs of registers 222-3, 223-3, and 224-3, of pipelined data path 293 are consolidated, and thus are not part of a redundant number system. Furthermore, it should be appreciated that the output of registers 223-2 and 224-2 of pipelined data path 292 are consolidated, and thus are not part of a redundant number system. Lastly, it should be appreciated that the output of registers 224-1 of pipelined data path 291 are consolidated, and thus likewise are not part of a redundant number system.

Although it might appear that more circuit resources are used by comparing phase accumulator 200A FIG. 2A with phase accumulator 300 of FIG. 3, it should be appreciated that the bit width of pipelined data paths 291 through 293 for equivalent data input widths, for example, of phase increment 201 as between FIGS. 2A and 3 are not the same. More particularly, bit width in each of pipelined data paths 291 through 293 for such example would be significantly narrower than in FIG. 2A, and thus fewer resources may be used.

Carry bits are stored and not rippled, and thus a "redundant number system" is used. For example, if 45 hex was added to 3E hex, the result in a conventional representation would be 83 hex. However, with a word split into two sections for example, namely two pipelined data paths, the result for uppermost pipelined data path 291 associated with MSBs would be 7 hex and the result associated with lowermost pipelined data path 292 for LSBs would be 13 hex. On a subsequent clock cycle, the one carry bit of lowermost pipelined data path 292 from the 13 hex is added to uppermost pipelined data path 291 along with newly received MSBs provided to such data path 291, such as for addition by adder 210-1 of FIG. 2D for example. To continue the example, if the newly received input is an AB hex value, the result would be 18 hex (e.g., 7+A+1), as the hex value of 7 and a carry bit from the 13 hex value are fed back to adder 210-1 for uppermost pipelined data path 291. For lowermost pipelined data path 292, the result of an add by adder 210-2 of FIG. 2D would result in a value of E hex (e.g., 3 fed back as a feedback output from registers 220-2 and the newly received input value of B).

Notably, a carry bit of uppermost pipelined data path 291 may be discarded, as phase accumulator 300 may be modulo $2^n$ count, where n is the total number of bits in an unsliced data path, where the number of slices is generally less than n. However, n may equal the number of slices. Assuming m to be bit width of a slice as associated with a pipelined data path, exclusive of a carry bit, then an adder cannot overflow because the maximum value of inputs are $2^m-1$, $2^m-1$, and 1. This may result in a $2^{(m+1)}-1$ addition which may be represented in m+1 bits in a follow-on register of the same pipelined data path. This m+1 bit representation is the same as it would be without any carry bits. For example, suppose a slice of a pipelined data path 292 has a width m equal to 3 for register 222-2, exclusive of a carry flip-flop or register thereof, then adder 213-2 cannot overflow as the maximum values in such a 3-bit system are the unsigned values of 7, 7, and 1. This results in the above $2^{(m+1)}-1$ addition as 15, which may be stored as 3 plus 1 bits, namely 4 bits. Moreover, in a two input m-bit wide adder, the range of inputs is 0 to $2^{(m-1)}$ on each operand. The sum produced by such an adder is in a range of 0 to $2^{(m+1)}-2$, which means m+1 bits are to be available for resulting sum. The inclusion of a carry-in bit to this addition by such an adder does not require any additional bit or bits for the output because the output range only increases to $2^{(m+1)}-1$, which may be represented with m+1 bits. Hence, the separate operations for carry bit consolidation, and any further addition such as for phase offset or dither for example, may be combined without causing an arithmetic overflow.

However, before output from a phase accumulator may be used, carry bits are propagated to a higher grouping of bits, namely to the relative MSBs of an associated pipelined data path. In other words, viewing the output of a phase accumulator having multiple pipelined data paths as being a segregated bus, it should be appreciated that the carry bits from what may be termed as relative LSB portions of the segregated bus are propagated to associated relative MSB portions, respectively, of such bus in order for the output to be consolidated.

With reference to FIG. 2D, it should be appreciated that registers 223-1 and 223-2, as well as adder 213-1 are included in pipeline stage 208 for this consolidation. In other words, following accumulation of any and all prior pipeline stages, a consolidation stage 208 is added at the end of the pipelined data paths or carry chains. Thus, as output of registers 223-1 and 223-2 of FIG. 2D having been consolidated, the phase slope signal is again in the form of a normal binary representation, and not a redundant number system.

Prior to providing an output from a phase accumulator, phase offset and dither noise input stages may be implemented, where there are n sections of each associated with a respective stage thereof. It should be appreciated that other known parameters may be used for modification of a phase slope output, and they too may be correspondingly added in the same way as the additions of respective stages for phase offset and dither noise. Moreover, any additions are located before the accumulated number is converted from a redundant number system back into a conventional binary representation of a number. In other words, such added sections occur before consolidation stage 208. Furthermore, accordioning additions by keeping each addition in a redundant number system means that instead of consolidating carry results of each addition, consolidation only occurs once after all additions associated with a pipelined data path have been performed. Thus, for example with reference to FIG. 2C, accumulation by accumulators 260 and 261 is followed by an addition by adder 212-1, which addition is performed in an redundant number system representation. The addition by adder 212-1 is followed by an addition by adder 213-1 to resolve a carry bit 232-3. Accordingly, it should be appreciated that the number of included stages used to resolve phase from a redundant number system back to a conventional binary number representation is n-1, where n is the number of pipelined data paths.

Figure 4:
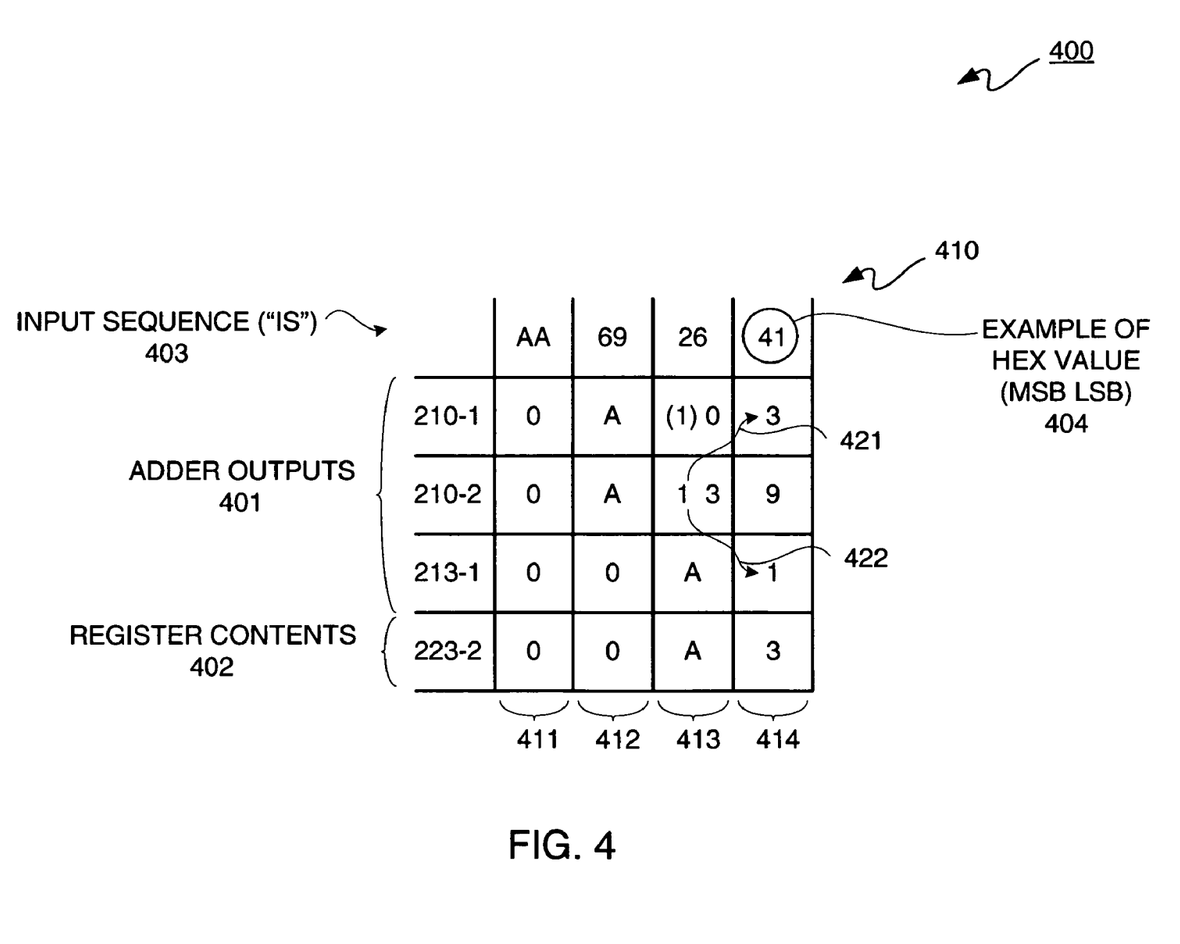
FIG. 4 is a table diagram depicting an exemplary embodiment of a data flow for an input sequence to the phase accumulator of FIG. 2D.

FIG. 4 is a table diagram depicting an exemplary embodiment of a data flow 400 for an input sequence 403 to phase accumulator 200D of FIG. 2D. With simultaneous reference to FIGS. 2D and 4, data flow 400 is further described.

Input sequence ("IS") 403 in this example is for phase increment 201. In this example, IS 403 is AA, 69, 26, and 41 all in hexadecimal or hex. For this particular example, input sequence 403 includes hex values 404 where the first hex number is for MSBs and the second hex number is for LSBs. Thus, for the circled example of 41 the 4 is the MSBs value in hex and the 1 is the LSBs value in hex. Furthermore, columns 411 through 414 represent a sequence of respective clock cycles. The first three rows of table 410 indicate adder outputs 401 for adders 210-1, 210-2, and 213-1, respectively. The last row indicates register contents 402 for register 223-2. With reference to clock cycle 411, phase accumulator 200D may be initialized to have all zero values and may receive the hex value AA. Accordingly, on a next clock cycle 412, output of adders 210-1 and 210-2 may be A and A, respectively. Output of adder 213-1 may be zero, and contents of register 223-2 may be zero.

On a next clock cycle 413, output of adder 210-1 may be 10 hex (e.g., 6+A); namely a zero with a leading carry bit. However, because adder 210-1 is in an uppermost pipelined data path the carry bit may be discarded, and thus it is indicated parenthetically in table 410.

Continuing with clock cycle 413, output of adder 210-2 is 3 hex and a carry bit of one (e.g., A+9) or 3 hex. Output of adder 213-1 is A hex and content of register 223-2 is A hex.

On a next clock cycle 414, output of adder 210-1 is 3 hex, this 3 hex where the carry bit output from register 231-1 is propagated as indicated by arrow 421 for addition with a zero fed back from register 220-1 and the input of 2 hex from IS 201. Output from adder 210-2 is 9 hex, namely the feedback output of 3 hex from register 220-2 plus the 6 hex input from IS 201. Output of adder 213-1 is a 1 hex, namely the carry bit output from registers 220-2 as indicated by arrow 422 plus the zero output from registers 220-1. The contents of register 223-2 for clock cycle 414 is 3 hex, namely the three previously output from register 220-2.

Figure 5:
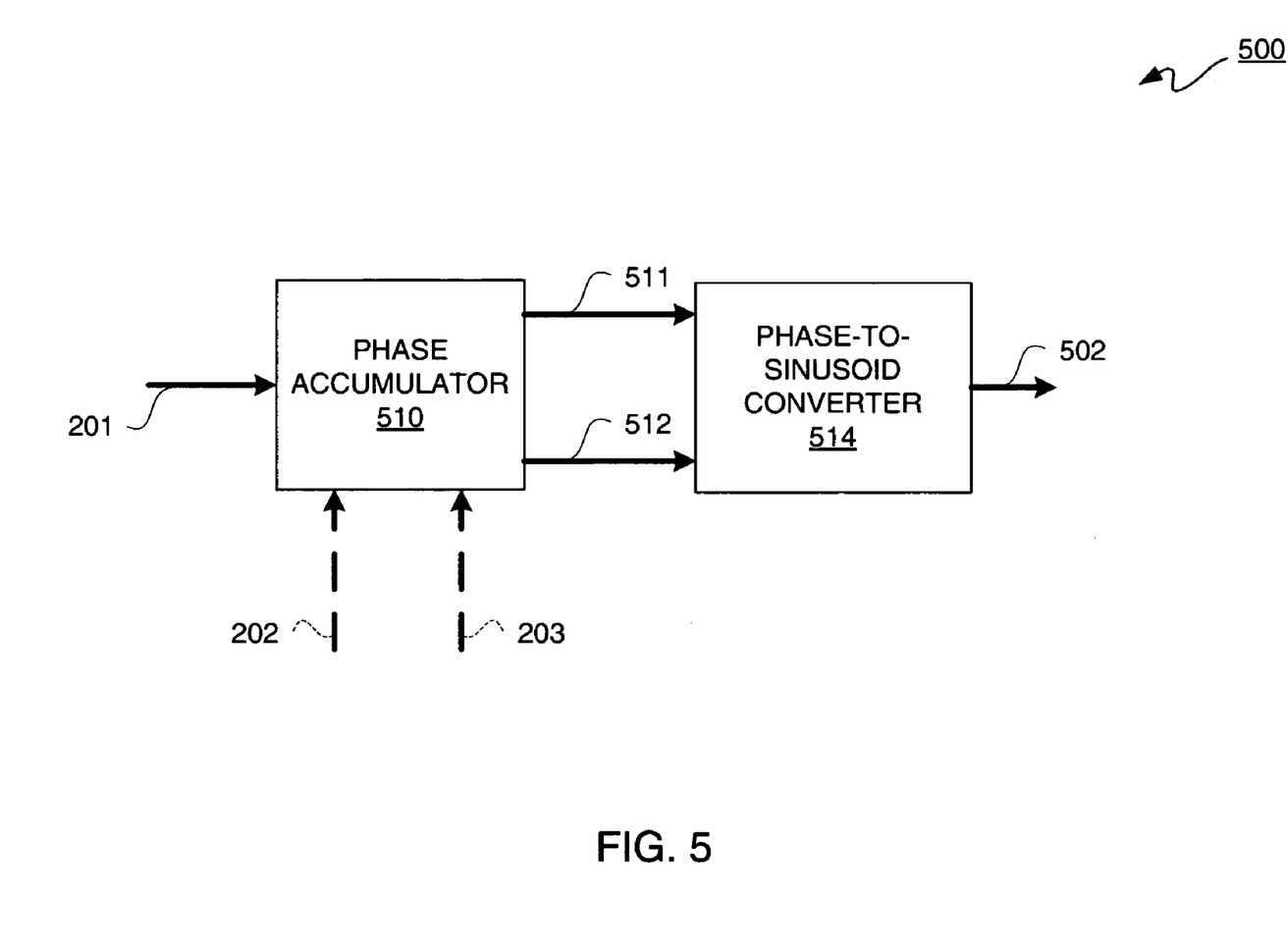
FIG. 5 is a block diagram depicting an exemplary embodiment of a Direct Digital Synthesizer ("DDS").

FIG. 5 is a block diagram depicting an exemplary embodiment of DDS 500. DDS 500 includes phase accumulator 510 and phase-to-sinusoid converter 514. Phase to sinusoid converter 514 may be conventional phase-to-sinusoid converter 514 employing a LUT as is known. Alternatively, phase-to-sinusoid converter 514 may employ a LUT having preconditioned values as described in additional detail in co-pending and commonly assigned patent application entitled "Phase-to-Sinusoid Conversion", by Gordon Old, filed on the date hereof, which is incorporated by reference herein in its entirety for all purposes.

Phase increment 201 is input to phase accumulator 510. Phase accumulator 510 may be phase accumulator having multiple pipelined data paths, as described herein with reference to FIGS. 2A through 2C and FIG. 3. Furthermore, phase accumulator 510 may have more than three pipelined data paths, in accordance with the above description. For phase accumulator 510 having optional stages such as for a phase offset input 202 or a dither noise input 203, or some other known digital signal processing input, it should be appreciated from the above description that additional stages may be added.

Phase accumulator 510 may have n respective outputs. In this example, phase accumulator 510 is shown with an output 511 and an output 512. Output 511 may be MSBs of a phase slope signal output from phase accumulator 510, and output 512 may be LSBs of a phase slope signal output from phase accumulator 510. Because phase accumulator 510 may be configured to separate out MSBs and LSBs, the latter of which may be considered an error portion if a quantizer was used, a quantizer or bus ripper may be omitted. Furthermore, in order to accommodate depth of a LUT of phase to sinusoid converter 514, bit width of output 511 may include bits from output 512. Thus, bits from both an uppermost pipelined data path, as well as one or more intermediate pipeline stages of phase accumulator 510, may be included to provide an address formed of MSBs of a phase slope signal. Output of phase to sinusoid converter 514 responsive to such addresses from phase accumulator 510 may be a digital representation of a sinusoid 502.

Accordingly, it should be appreciated that a pipeline phase accumulator has been described having multiple data paths. Furthermore, it should be appreciated that the number of register stages of each of the pipelined data paths or carry chains may be reduced as described above. Depending on the application, there may be available latency. If however, there is no available latency, then only one extra column of registers may be implemented to consolidate a carry. If excess latency is one clock cycle, then two additional register columns may be added to consolidate carry bits. Furthermore, if two clock cycles of latency may be tolerated, three extra columns of registers may be used to consolidate carry bits. Moreover, it should be appreciated that memory may be used to time multiplex LSBs and MSBs, which are accumulated in the same cycles.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for accumulation of information in an integrated circuit, comprising:
   obtaining increments of the information in succession, wherein the increments are phase increments;
   separating each increment of the increments into at least a first portion and a second portion;
   the first portion being associated with Most Significant Bits of the increment;
   the second portion being associated with Least Significant Bits of the increment;
   inputting the first portion to a first adder of a first accumulator circuit of the integrated circuit to provide a first sum;
   inputting the second portion to a second adder of a second accumulator circuit of the integrated circuit to provide a second sum;
   storing the first sum in a first storage device;
   storing the second sum in a second storage device;
   outputting the first sum stored in the first storage device for feedback input to the first adder for addition with a next first portion of a next increment of the increments;
   outputting the second sum stored in the second storage device for feedback input to the second adder for addition with a next second portion of the next increment of the increments;
   generating a carry bit responsive to each wrap condition associated with the storing in the second storage device;
   outputting the carry bit from the second storage device;
   feeding back the carry bit to the first adder; and
   feeding forward the carry bit for addition with the first sum output from the first storage device;
   wherein the increments are divided into at least the first portion and second portion for parallel processing using two data paths,
   wherein the first adder and first storage device form a first parallel data path, and the second adder and second storage device form a second parallel data path,
   wherein the parallel data paths are implemented in programmable resources of a programmable integrated circuit,
   wherein the first sum and the second sum are respectively accumulated as numbers represented in a redundant number system.

2. The method according to claim 1, wherein the increments are obtained from a bus divided into more than the first portion and the second portion for parallel processing using more than two pipelined data paths.

3. The method according to claim 1, wherein the increments are changing on each clock cycle.

4. The method according to claim 1, wherein the first storage device, the second storage device, the first adder, and the second adder are associated with a stage of pipeline.

5. The method according to claim 4, wherein the stage of the pipeline is a phase accumulator stage.

6. The method according to claim 5, further comprising:
   obtaining a phase offset;
   separating the phase offset into a Least Significant Bit group and a Most Significant Bit group;
   inputting the first sum, the Most Significant Bit group of the phase offset, and the carry bit to a third adder to provide a third sum;
   inputting the second sum and the Least Significant Bit Group of the phase offset to a fourth adder to provide a fourth sum; and the third sum and the fourth sum being represented in the redundant number system.

7. The method according to claim 5, further comprising:
   obtaining a dither noise input;
   separating the dither noise input into a Least Significant Bit group and a Most Significant Bit group;
   inputting the first sum, the Most Significant Bit group of the dither noise input, and the carry bit to a third adder to provide a third sum;
   inputting the second sum and the Least Significant Bit Group of the dither noise input to a fourth adder to provide a fourth sum; and
   the third sum and the fourth sum being represented in the redundant number system.

8. The method according to claim 5, further comprising:
   adding the carry bit feed forward with the first sum output from the first storage device using a third adder to provide a third sum for consolidation into a non-redundant number system;
   storing the third sum output from the third adder in a third storage device; and
   storing the second sum output from the second storage device in a fourth storage device; wherein a carry chain stage is separated into the parallel data paths.

9. The method according to claim 8, wherein at least one data path of the parallel data paths is of Most Significant Bit pipelined stages; and wherein at least one other data path of the parallel data paths is of Least Significant Bit pipelined stages.

10. The method according to claim 8, wherein the Most Significant Bit pipelined stages and the Least Significant Bit pipelined stages each do not have interim register stages therebetween for passing values represented in the redundant number system.

11. The method according to claim 8, wherein the parallel data paths are implemented in programmable logic of a programmable logic device.

12. The method according to claim 1, wherein the first storage device and the second storage device are implemented using Random Access Memory; and the method further comprising time multiplexing access to and from the Random Access Memory.

13. The method according to claim 1, wherein the first storage device and the second storage device are synchronously operated registers.

14. A circuit for direct digital synthesis or numerically controlled oscillation, comprising:
 a phase accumulator;
 a carry chain coupled to the phase accumulator;
 the phase accumulator and the carry chain configured as a pipeline having parallel data paths;
 a first data path of the parallel data paths being for Most Significant Bits;
 a second data path of the parallel data paths being for Least Significant Bits;
 the phase accumulator configured to accumulate phase increments separated out into a first storage device and a second storage device respectively associated with the first data path and the second data path;
 the second storage device configured for wrap around operation; the second storage device coupled to a first adder associated with the first storage device;
 the second storage device configured to produce a carry bit responsive to a wrap around condition for feedback input to the first adder and feed-forward input to a second adder;
 both the first adder and the second adder forming part of the first data path;
 an output port of the first storage device coupled for feed-forward input to the second adder and for feed-back input to the first adder;
 an output port of the first adder coupled for feed-forward input to the first storage device;
 an output port of the second storage device coupled for feed-forward input along the second data path and for feed-back input to a third adder;
 an output port of the third adder coupled for feed-forward input along the second data path for the second storage device;
 the first adder coupled to receive a first portion of the phase increments associated with the Most Significant Bits; and
 the third adder coupled to receive a second portion of the phase increments associated with the Least Significant Bits;
 wherein the first data path and the second data path are implemented in programmable resources of a programmable integrated circuit.

15. The circuit according to claim 14, wherein the first data path and the second data path are implemented in programmable logic of a programmable logic device.

16. The circuit according to claim 14, wherein the phase accumulator uses a redundant number system for accumulating the phase increments.

17. A method for direct digital synthesis or numerically controlled oscillation in an integrated circuit, comprising:
 separating a phase increment into respective sequential groupings of bits for parallel pipelined data paths;
 for each of the parallel pipelined data paths not an uppermost one of the parallel pipelined data paths:
  obtaining an associated portion of the sequential groupings of bits;
  respectively accumulating, in an accumulator circuit of the integrated circuit, an associated portion of the sequential groupings of bits to provide a sum;
  generating a carry bit responsive to a wrap around condition caused by the accumulating;
  feeding the carry bit backward for addition in the accumulator circuit of a proximate upper parallel pipelined data path with the sum and sequential grouping of bits associated with the proximate upper parallel pipelined data path; and
  feeding the carry bit forward for addition with the sum output from the accumulator circuit of the proximate upper parallel pipelined data path;
 wherein the parallel pipelined data paths are implemented in programmable resources of a programmable integrated circuit.

18. The method according to claim 17, wherein the uppermost one of the parallel pipelined data paths is configured for the wrap around condition but carry information associated therewith is not used.

19. The method according to claim 17, wherein values associated with the sequential groupings of bits to be accumulated are represented using a redundant number system.

\* \* \* \* \*